US009328790B2

(12) United States Patent
Shimasaki

(10) Patent No.: US 9,328,790 B2
(45) Date of Patent: May 3, 2016

(54) HYDRAULIC SHOCK ABSORBER

(71) Applicant: SHOWA CORPORATION, Gyoda-shi (JP)

(72) Inventor: Masao Shimasaki, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 104 days.

(21) Appl. No.: 14/038,873

(22) Filed: Sep. 27, 2013

(65) Prior Publication Data

US 2014/0291090 A1  Oct. 2, 2014

(30) Foreign Application Priority Data

Mar. 28, 2013  (JP) .................................. 2013-070001

(51) Int. Cl.
| F16F 9/00 | (2006.01) |
| F16F 9/34 | (2006.01) |
| F16F 9/22 | (2006.01) |
| B62K 25/08 | (2006.01) |
| F16F 9/18 | (2006.01) |
| F16F 9/36 | (2006.01) |
| F16F 9/14 | (2006.01) |
| F16F 7/09 | (2006.01) |

(52) U.S. Cl.
CPC . F16F 9/34 (2013.01); B62K 25/08 (2013.01); F16F 9/185 (2013.01); F16F 9/22 (2013.01); F16F 7/09 (2013.01); F16F 9/14 (2013.01)

(58) Field of Classification Search
CPC ................. F16F 7/00; F16F 7/09; F16F 9/00; F16F 9/10; F16F 9/103; F16F 9/14; F16F 9/18; F16F 9/158; F16F 9/3207; F16F 9/3235; F16F 9/34; F16F 9/36; F16F 15/023; F16F 9/22; F16F 9/185; B62K 25/08
See application file for complete search history.

(56) References Cited

U.S. PATENT DOCUMENTS

| 4,795,009 | A | * | 1/1989 | Tanahashi et al. ............. 188/315 |
| 6,044,940 | A | * | 4/2000 | Marzocchi et al. ........ 188/299.1 |
| 6,588,555 | B2 | * | 7/2003 | Rottenberger et al. ....... 188/285 |
| 2003/0173170 | A1 | * | 9/2003 | Nagai ........................... 188/316 |
| 2005/0127587 | A1 | * | 6/2005 | Nagai ........................... 267/266 |
| 2009/0084644 | A1 | * | 4/2009 | Murakami ................. 188/266.6 |
| 2009/0107785 | A1 |   | 4/2009 | Nagai |

FOREIGN PATENT DOCUMENTS

| JP | 2009-108884 | 5/2009 |
| JP | 2010-236577 | 10/2010 |
| JP | 2011-94710 A | 5/2011 |

OTHER PUBLICATIONS

European Search Report mailed Dec. 3, 2014 for the corresponding European Application No. 13186300.3.

* cited by examiner

*Primary Examiner* — Melody Burch
(74) *Attorney, Agent, or Firm* — Leason Ellis LLP

(57) ABSTRACT

A hydraulic shock absorber provides, a ring-shaped flow passage formed continuously along a circumferential direction between an outer circumference of a partition wall member and an inner circumference of an inner tube, in a range from an abutting surface to a screw coupling starting portion of a thread section of the inner tube; an outer side flow passage which is formed to a ring-shaped oil chamber side from a dividing member positioned on an open end surface side of the inner tube and which connects a ring-shaped oil chamber and the ring-shaped flow passage, an inner side flow passage which is formed in the partition wall member and which connects the ring-shaped flow passage and an oil reservoir chamber.

6 Claims, 8 Drawing Sheets

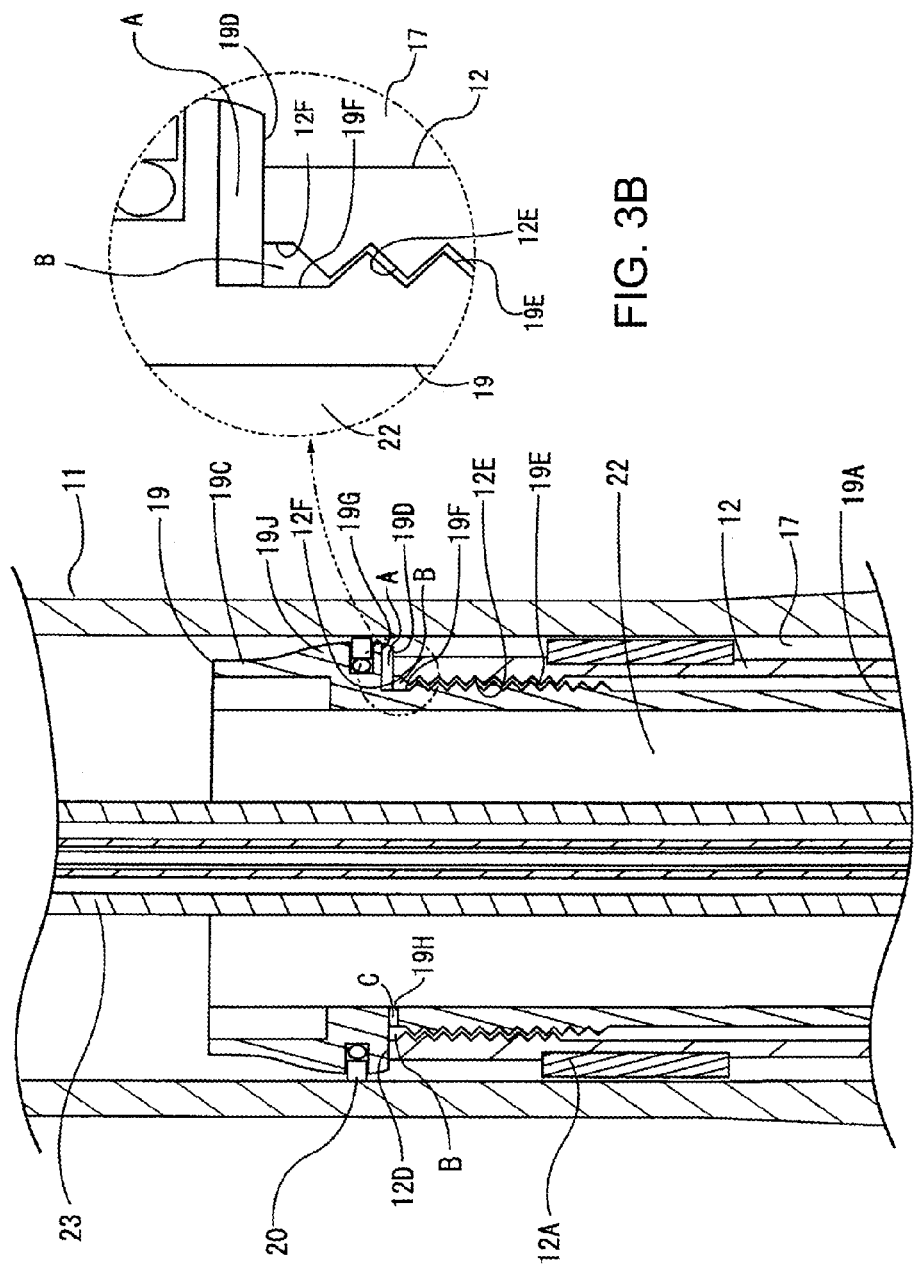

A1-A1      B1-B1      C1-C1

Sa         Sb         Sc

HYDRAULIC SHOCK ABSORBER

CROSS-REFERENCE TO RELATED APPLICATIONS

This application is based on and claims priority under 35 U.S.C. 119 from Japanese Patent Application No. 2013-070001 filed on Mar. 28, 2013, the entire content of which is incorporated herein by reference.

BACKGROUND

1. Technical Field

The present invention relates to a hydraulic shock absorber which is capable of expelling air bubbles collected inside an oil chamber, into an air chamber.

2. Related Art

In a front fork of a motorcycle which is one example of a hydraulic shock absorber, bushes are fixed to the top and bottom of an inner circumference of an outer tube, an inner tube is fitted slidably via these upper and lower bushes, and a ring-shaped oil chamber defined by the upper and lower bushes is formed in the space between the inner circumference of the outer tube and the outer circumference of the inner tube, whereby a volume compensating chamber for the entry and withdrawal of a piston rod during a stroke is formed. In a front fork of this kind, a partition wall member is installed on the inside of an opening end side of the inner tube, in order to guide the piston rod which is installed on the outer tube. The partition wall member is constituted by a cylinder section which is formed in a cylindrical shape along the inner circumference of the inner tube, and a bottom section which is provided so as to close off the bottom of the cylindrical section, and by screw coupling the cylinder section with the inner tube, the bottom section is positioned inside the inner tube and the bottom section forms a reference which defines a hydraulic oil chamber in which a piston attached to the piston rod fixed to an outer tube performs a sliding motion, below the bottom section, and an oil reservoir chamber for supplying and expelling hydraulic oil to and from the hydraulic oil chamber, above the bottom section. This hydraulic oil chamber is connected to the ring-shaped oil chamber via an oil hole which is provided in the inner tube, whereby the hydraulic oil can pass freely, and when the front fork is compressed, hydraulic oil of an amount corresponding to the volume of the piston rod that has entered into the hydraulic oil chamber during the stroke flows out from the hydraulic oil chamber and into the ring-shaped oil chamber, and when the front fork is extended, hydraulic oil of an amount corresponding to the volume of the piston rod that has withdrawn during the stroke from the hydraulic oil chamber flows into the hydraulic oil chamber from the ring-shaped oil chamber, whereby volume compensation for entry and withdrawal of the piston rod is performed and a prescribed damping force is obtained (Patent Literature 1 (JP-A-2009-108884)).

However, in a hydraulic shock absorber having a composition of this kind, since air bubbles contained in the hydraulic oil during operation gradually collect in the ring-shaped oil chamber and a gap between the partition wall member and the inner tube, then a collection of unwanted air bubbles arises, and hence the prescribed damping force is obtained after this collection of air bubbles has been compressed by the hydraulic oil during a compression operation, and a problem arises in that slackness occurs in the damping action. Therefore, in order to resolve problems of this kind, Patent Literature 2 (JP-A-2010-236577) discloses a composition in which an air escape path connecting a ring-shaped oil chamber and an oil reservoir chamber is provided, and this air escape path is opened and closed by an O-ring that functions as a check valve performing an opening and closing operation in accordance with an extension and compression action of the air escape path, and the collection of air bubbles present in the ring-shaped oil chamber is pushed out into the oil reservoir chamber during an external operation.

However, in the hydraulic shock absorber relating to the composition of this kind, since the check valve, such as the O-ring, is required, then this composition is difficult to adopt from the viewpoint of reducing space requirements, reducing the number of components, and restricting manufacturing costs by simplifying the structure.

SUMMARY OF INVENTION

The present invention was devised in view of the problems described above, an object thereof being to provide a hydraulic shock absorber which expels air bubbles that have collected in an oil chamber, such as a ring-shaped oil chamber in a hydraulic shock absorber, to an air chamber, and in which slackness does not occur in the damping action during operation, while reducing space requirements and lowering costs.

An aspect of the present invention is directed to a hydraulic shock absorber for a vehicle, including: an outer tube; an inner tube which is inserted movably inside an outer tube; a ring-shaped oil chamber which is formed by a plurality of dividing members which divide a space formed by an inner circumference of the outer tube and an outer circumference of the inner tube, in an axial direction; a partition wall member which is installed in an open side end section of the inner tube and which divides an internal space of the inner tube into an oil reservoir chamber and a hydraulic oil chamber along the axial direction; an abutting surface which projects in a radial direction from an outer circumference of the partition wall member and which abuts against an open side end surface of the inner tube in a state that the partition wall member is installed on the inner tube; a piston rod which is installed on the outer tube and which passes through the partition wall member and reaches into the hydraulic oil chamber, cross-sectional area of the ring-shaped oil chamber being set to be larger than a cross-sectional area of the piston rod; a piston which is provided on a hydraulic oil chamber side of the piston rod and which slides in contact with an inner circumference of the inner tube, the piston dividing the hydraulic oil chamber into a piston rod side oil chamber and a piston side oil chamber; and an oil hole which is provided in the inner tube and connects between the ring-shaped oil chamber and the piston rod side oil chamber, in which a the partition wall member is installed on the inner tube by screw coupling of a thread section formed in a prescribed range in the axial direction on the outer circumference of the partition wall member, and a thread section formed in a prescribed range in the axial direction on the inner circumference of the inner tube, and the hydraulic shock absorber further comprises: a ring-shaped flow passage formed continuously along a circumferential direction between the outer circumference of the partition wall member and the inner circumference of the inner tube, in a range from the abutting surface to a screw coupling starting portion of the thread section of the inner tube; an outer side flow passage which is formed to a ring-shaped oil chamber side from the dividing member positioned on an open end surface side of the inner tube and which connects the ring-shaped oil chamber and the ring-shaped flow passage, an inner side flow passage which is formed in the partition wall member and which connects the ring-shaped flow passage and the oil reservoir chamber.

Therefore hydraulic oil inside the ring-shaped oil chamber is compressed by decrease in the volume of the ring-shaped oil chamber in an extension side stroke of the hydraulic shock absorber, thereby pressurizing compressible air bubbles collected in the ring-shaped oil chamber by the hydraulic oil which is non-compressible, and pushing out the air bubbles together with the hydraulic oil into the hydraulic oil chamber via the outer side flow passage, the ring-shaped flow passage and the inner side flow passage. Moreover, since the air bubbles collected in the gap between the partition wall member and the inner tube are also pushed out into the ring-shaped flow passage and the inner side flow passage, then it is possible to prevent slackness of an operation of the hydraulic shock absorber due to the presence of air bubbles which have stagnated in the ring-shaped oil chamber and in the gap between the partition wall member and the inner tube, and a good damping operation can be maintained at all times while reducing space requirements and reducing costs, without requiring a known check valve composition.

The hydraulic shock absorber may have a configuration in which the ring-shaped flow passage is formed in a range between the thread section formed on the partition wall member and an incomplete thread section on a screw coupling starting side in the thread section formed on the inner tube.

In addition to the beneficial effects obtained by the configuration described above, there is no need to newly form a separate ring-shaped flow passage, and therefore it is possible to reduce the labor input for providing a ring-shaped flow passage.

The hydraulic shock absorber may have a configuration in which the outer side flow passage is formed as a groove reaching the ring-shaped oil chamber from the ring-shaped flow passage, by cutting away a portion of the abutting surface of the partition wall member.

In addition to the beneficial effects obtained by the configuration described above, it is possible to form the outer side flow passage easily, and both the inner side flow passage and the outer side flow passage are formed in the partition wall member and the positional relationship therebetween can be set accurately.

The hydraulic shock absorber may further include a ring member arranged between the abutting surface of the partition wall member and the open end surface of the inner tube, in which the outer side flow passage is formed by a cutaway section provided in the ring member.

In addition to the beneficial effects obtained by the configuration described above, it is possible to form the outer side flow passage simply by sandwiching the ring member when installing the partition wall member and the inner tube.

The hydraulic shock absorber may have a configuration, in which a cross-sectional area of a flow passage cross-section of the inner side flow passage is set to be smaller than each of a cross-sectional area of a flow passage cross-section of a ring-shaped flow passage and a cross-sectional area of a flow passage cross-section of the outer side flow passage.

In addition to the beneficial effects obtained by the configuration described above, it is possible to prevent reverse flow of air in the oil reservoir chamber into the ring-shaped flow passage and the gaps between the partition wall member and the inner tube.

The hydraulic shock absorber may have a configuration in which, a plurality of the inner side flow passages are provided in the partition wall member, and a total cross-sectional area of the flow passage cross-sections of the plurality of inner side flow passages is set to be smaller than each of a cross-sectional area of a flow passage cross-section of the ring-shaped flow passage and a cross-sectional area of a flow passage cross-section of the outer side flow passage.

It is possible to prevent reverse flow of air in the oil reservoir chamber into the ring-shaped flow passage and the gaps between the partition wall member and the inner tube.

BRIEF DESCRIPTION OF DRAWINGS

FIG. 3A is a principal cross-sectional diagram of a front fork, and FIG. 3B shows an enlarged portion of FIG. 3A;

DESCRIPTION OF EMBODIMENTS

First Embodiment

Figure 1:
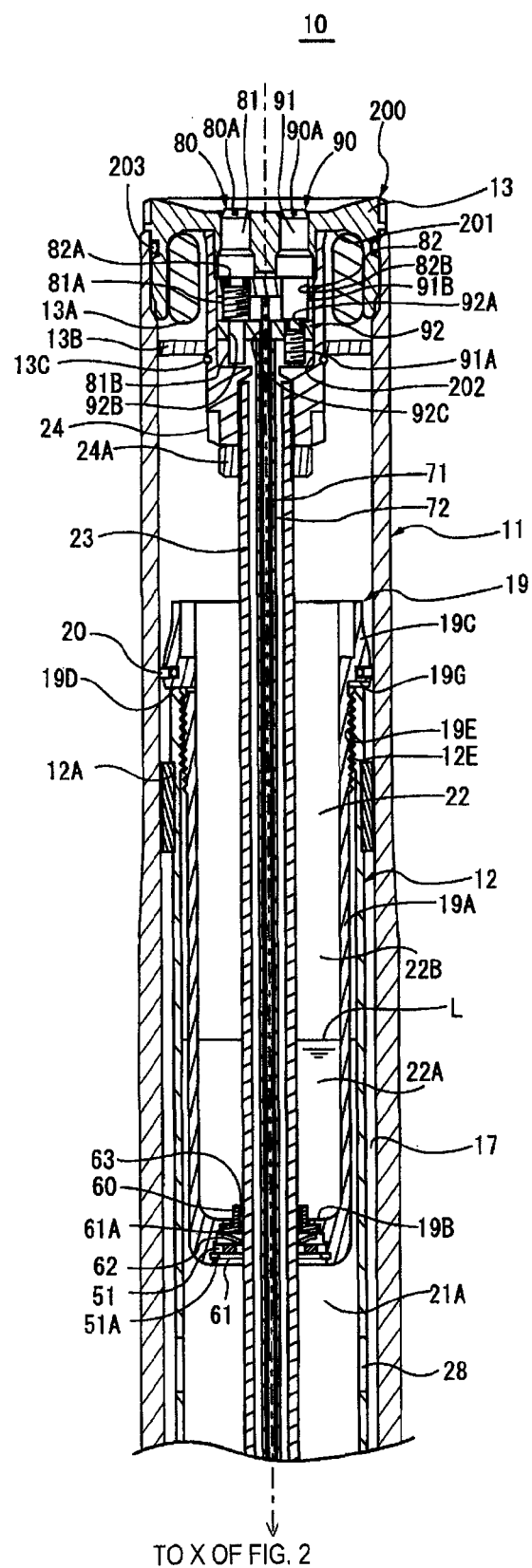
FIG. 1 is a cross-sectional diagram of a front fork.
Figure 2:
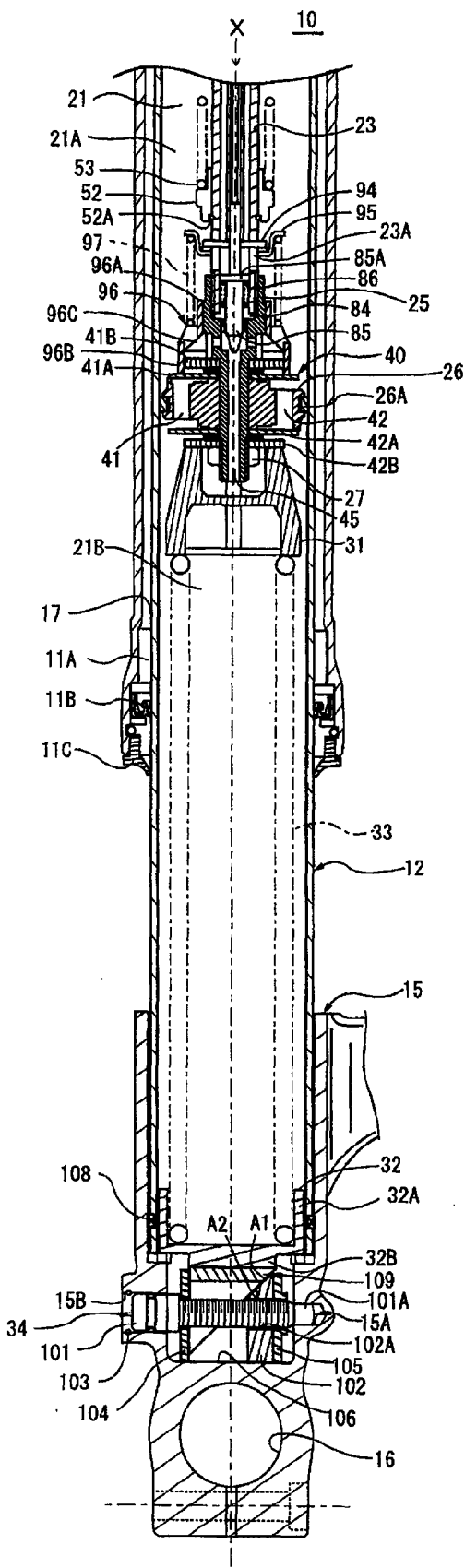
FIG. 2 is a cross-sectional diagram of a front fork.

FIG. 1 and FIG. 2 are cross-sectional diagrams of a front fork of a motorcycle showing one embodiment of a hydraulic shock absorber. As shown in FIG. 1 and FIG. 2, the front fork (hydraulic shock absorber) 10 is an upside-down front fork in which an outer tube 11 is arranged on a vehicle body side and an inner tube 12 is arranged on a wheel side, the front fork 10 being installed so as to extend in a vertical direction with respect to the vehicle body.

An inner tube 12 and an outer tube 11 are provided in mutually slidable fashion on the front fork 10. An axle bracket 15 is installed on a lower end of the inner tube 12, and a bottom section is formed in the inner tube 12. A cap 13 is installed on an upper end of the outer tube 11, and a ceiling section is formed in the outer tube 11. A suspension spring 33 is provided inside the front fork 10. A lower end of the suspension spring 33 is seated on the axle bracket 15 and an upper end thereof is supported via an upper spring holder 31 on a piston 26 which is installed on a lower end of a piston rod 23 that is fixed to the cap 13. An inner circumference of the inner tube 12 is a cylinder which is formed with a uniform internal diameter along an axial direction, and in which the piston 26 can slide in the axial direction. Furthermore, a prescribed amount of hydraulic oil (labeled with the symbol L in the drawings) is introduced into the inner tube 12 until reaching an oil reservoir chamber 22, which is described below.

The respective compositional features of the front fork 10 are described in detail below with reference to FIG. 1 to FIG. 3.

The inner tube 12 is a cylindrical body having a prescribed material thickness, of which both ends are open, and the inner tube 12 includes the axle bracket 15 on which an axle is installed, and a rod guide case 19.

The axle bracket 15 is a bottomed cylindrical body on which one end is open, and a cylindrical portion thereof is installed by being screw coupled with a thread section which is formed on an outer circumference of a lower end of the inner tube 12. A seal member 108 which maintains a liquid-tight seal with respect to the inner tube 12 is provided on an inner circumference of a bottom section side of an axle bracket 15. The axle bracket 15 includes an axle installation hole 16 on which an axle can be installed, and a spring load adjustment apparatus 34 which adjusts a load of the suspension spring 33.

The axle installation hole 16 is formed on a lower end side of the axle bracket 15, as a through hole passing in a direction orthogonal to an axial line of the axle bracket 15. The spring load adjustment apparatus 34 is provided on a bottom portion of the axle bracket 15, and in general terms, is constituted by an adjustment bolt 101, and a pair of sliders 102 and 109. The adjustment bolt 101 is a bolt having a front end shaft section 101A extending in the form of a shaft having a smaller diameter than the thread section, on a front end thereof, and having an O-ring on an outer circumference of a head section. The adjustment bolt 101 is installed rotatably with respect to installation holes 15A, 15B which are formed coaxially so as to traverse the cylindrical shape in a direction orthogonal to the axial line of the axle bracket 15, above a bottom surface 106 of the axle bracket 15. Of the installation holes 15A, 15B, one installation hole 15A is a closed hole and the other installation hole 15B is a through hole. The installation hole 15B is formed to a size which enables the head section of the adjustment bolt 101 to be accommodated therein.

The front end shaft section 101A of the adjustment bolt 101 is inserted into the installation hole 15A, the head section thereof is accommodated in the installation hole 15B, and the O-ring which is installed on the head section creates a liquid-tight seal between the head section and the installation hole 15B, as well as functioning as a retaining member. A stopper ring 103 is inserted onto the opening section side of the installation hole 15B, whereby detachment of the adjustment bolt 101 is prevented.

A washer 104, a slider 102 and a nut 105 are inserted in this order, from the head side, on an intermediate section of the adjustment bolt 101. The washer 104 has a quadrilateral shape, for example, and a base edge thereof abuts against the bottom surface 106 of the axle bracket 15. The slider 102 is inserted after the washer 104, and a nut 105 is placed alongside the slider 102 and is screwed onto the thread section of the adjustment bolt 101. The nut 105 is a plate-shaped component which is formed in a quadrilateral shape, and is provided with a screw hole passing through a plate thickness direction, and a lower edge of the nut 105 abuts against the bottom surface 106 of the axle bracket 15 so as to prevent rotation thereof. Consequently, the nut 105 moves only in an axial direction of the adjustment bolt 101, without rotating conjointly when the adjustment bolt 101 rotates.

The slider 102 is a long block body, which has a through hole 102A through which the adjustment bolt 101 passes in a thickness direction. A lower surface of the slider 102 in a lengthwise direction abuts against the bottom surface 106 when the adjustment bolt 101 has been passed through the through hole 102A. For example, the lower surface is formed in a flat shape, and the upper surface is formed as a lower side oblique surface A1 which is oblique in a straight line maintaining a prescribed angle with respect to the lower surface. The slider 109 which has an upper side oblique surface A2 that corresponds to the lower side oblique surface A1 is mounted on top of the slider 102.

An outer circumference of the slider 109 is formed as a column-shaped body following an inner circumferential surface of the inner tube 12, and a lower surface of the slider 109 is formed as the upper oblique surface A2 which is oblique with respect to the lower side oblique surface A1. When the upper side oblique surface A2 is abutted against the lower side oblique surface A1, the lower end of the slider 109 reaches below the adjustment bolt 101, and forms a U-shaped section straddling the adjustment bolt 101. An upper surface of the slider 109 is formed so as to be oblique with respect to the upper side oblique surface A2 and so as to be parallel with the bottom surface of the axle bracket 15. A lower spring holder 32 on which the lower end of the suspension spring 33 is seated is provided on this upper surface of the slider 109.

The lower spring holder 32 is formed in the shape of a cylindrical cup having a bottom, and an outer circumference of the cylindrical section 32A has a size which contacts the inner circumference of the inner tube 12, while a bottom section 32B is formed in an integrated fashion with the cylindrical section 32A so as to close off a lower end section of the cylindrical section 32A.

The axle bracket 15 is screw coupled to the outer circumference of the inner tube 12, and a liquid-tight state is maintained by a seal member 108 which is arranged between the inner circumference of the axle bracket 15 and the outer circumference of the inner tube 12. Furthermore, the inner tube 12 is inserted in a substantially gap-free state between the inner circumference of the axle bracket 15 and the cylindrical section 32A of the lower spring holder 32.

According to the spring load adjustment apparatus 34 having this composition, when the adjustment bolt 101, which is exposed externally upon assembly of the front fork 10, moves along the thread, the lower spring holder 32 slides against the inner circumference of the inner tube 12 and is raised or lowered, via the upper side oblique surface A2 of the slider 109 which is integrated with the lower spring holder 32, and the lower side oblique surface A1 of the slider 102. In other words, the lower spring holder 32 can raise and lower the adjustment bolt 101 by a threading movement, and it is possible to adjust a spring load of the suspension spring 33 by adjusting the initial length of the suspension spring 33 between the lower spring holder 32 and the upper spring holder 31 on the side of the piston rod 23, which is described below.

Next, the composition of the inner tube 12 will be described.

As shown in FIG. 1, a slide bush 12A which can slide along an inner circumferential surface of the outer tube 11 is installed on an outer circumferential surface of an upper end side of the inner tube 12. The slide bush 12A is a bearing formed in a cylindrical shape, which is fitted inside a recess section formed with a slightly smaller diameter than the outer diameter, on the outer circumference of the inner tube 12. Furthermore, an outer circumference of the slide bush 12A is set to a dimension whereby the slide bush 12A projects to an outer side from the outer circumference of the inner tube 12, when in an installed state on the inner tube 12.

A rod guide case 19 is installed on the upper end side of the inner tube 12. The piston rod 23 slides along the rod guide case 19. The rod guide case 19 also functions as a partition wall member which divides the internal space of the inner tube 12 into an oil reservoir chamber 22 and a hydraulic oil chamber 21.

The rod guide case 19 is formed on a bottomed cylinder shape with an opening on one side, which is constituted by a cylinder section 19A that extends along the axial direction of the inner tube 12, and a bottom section 19B which forms a bottom of the cylinder section 19A. As shown in FIGS. 3A and 3B, a projecting upper end section 19C which increases diameter in a stepwise fashion while extending and decreasing in diameter in the axial direction is formed on an upper end section of the cylinder section 19A. The projecting upper end section 19C has a protruding section 19J in which an outer circumference protrudes in a radial direction beyond the outer diameter of the inner tube 12, and an abutting surface 19D which abuts with a front end surface of the inner tube 12 is formed on a lower side of this protruding section 19J. A seal member 20 which maintains a liquid-tight seal with the inner circumference of the outer tube 11 is provided on the outer circumference of the protruding section 19J.

The seal member 20 is fitted inside a round circumference groove formed along a circumferential direction on the outer circumference of the protruding section 19J, and slides in contact with an inner circumferential surface of the outer tube 11. The seal member 20 constitutes one dividing member which define a space between the outer circumference of the inner tube 12 and the inner circumference of the outer tube 11, as a ring-shaped oil chamber 17. The guide bush 11A which is provided on the outer tube 11 described below corresponds to a further dividing member corresponding to this seal member 20.

The abutting surface 19D is formed as a orthogonal surface which is orthogonal with respect to the axial line of the inner tube 12, and makes contact along the whole circumference of the open side end surface 12D which is the front end surface of the inner tube 12, thereby sealing the internal space of the inner tube 12.

A thread section 19E which screws together with the thread section 12E formed on the inner surface of the inner circumference of the inner tube 12 is formed in a prescribed range along the axial direction on an outer circumference of the cylinder section 19A which extends on a lower side of the abutting surface 19D. As shown in FIGS. 3A and 3B, the thread section 19E is processed with a male thread, for example, and is formed through a prescribed range in the axial direction via an incomplete thread section 19F which is formed as a flat surface extending downwards from the abutting surface 19D. Furthermore, the thread section 12E which screws together with the thread section 19E is processed with a female thread, for example, and is formed through a prescribed range in the axial direction via an incomplete thread section 12F which is formed as a flat surface extending slightly downwards from the open side end surface 12D. In other words, when the rod guide case 19 is screwed in from a side of the open side end surface 12D of the inner tube 12, then the thread sections 12E, 19E are screw coupled strongly to each other, and furthermore, a ring-shaped flow passage B is formed on the side of the open side end surface 12D as a gap in which the mutually opposing incomplete thread sections 12F, 19F extend in continuous fashion along the circumferential direction.

In other words, the ring-shaped flow passage B is a gap which is formed in a range from the open side end surface 12D to a screw coupling starting portion where the screw coupling of the thread section 12E and the thread section 19E starts (in the present example, the range between the incomplete thread sections 12F and 19F).

Furthermore, a cutaway groove 19G having a depth reaching a circumferential surface of the incomplete thread section 19F is formed from an outer circumferential surface of the projecting upper end section 19C, in the abutting surface 19D of the projecting upper end section 19C. The cutaway groove 19G is formed so as to extend in a radial direction of the projecting upper end section 19C, for example, and constitutes an outer side flow passage A which connects the ring-shaped oil chamber 17 and the ring-shaped flow passage B, when the rod guide case 19 is installed on the inner tube 12.

Figure 4A:
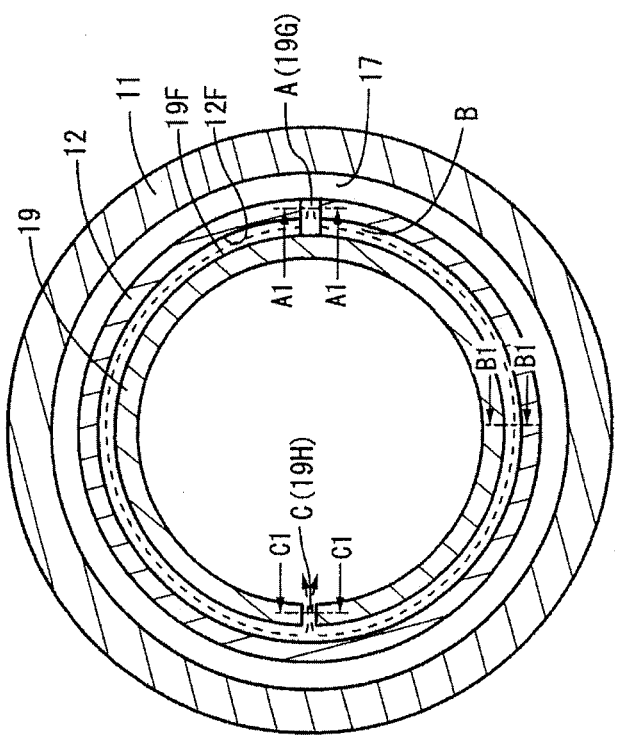
FIG. 4A is a conceptual diagram of an air bubble discharge flow passage.

Furthermore, a through hole 19H which passes through the incomplete thread section 19F in the thickness direction of the cylinder section 19A is provided. As shown in FIG. 4A, the through hole 19H is provided in a position displaced by 180° so as to oppose the cutaway groove 19G which is provided as an outer side flow passage A, and constitutes an inner side flow passage C connecting the oil reservoir chamber 22 and the ring-shaped flow passage B, which is an internal space of the rod guide case 19. In this way, by respectively displacing the positions of the outer side flow passage A and the inner side flow passage C by 180°, a flow passage length from the outer side flow passage A to the inner side flow passage C is a maximum length, and reverse flow of air from an air chamber 22B of the oil reservoir chamber 22 to the ring-shaped oil chamber 17 can be prevented. Furthermore, by forming the cutaway groove 19G and the through hole 19H in the same member, namely, the rod guide case 19, then it is possible to set the flow passage length accurately in accordance with the ring-shaped flow passage B. Furthermore, when installing the rod guide case 19 on the inner tube 12, it is not necessary to take notice of the positions of the outer side flow passage A and the inner side flow passage C, and therefore the productivity can be improved.

Figures 4B, 4C, 4D:
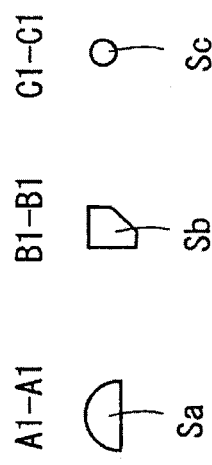
FIGS. 4B, 4C and 4D show cross sectional diagrams of the flow passages A, B and C respectively.

As shown in FIGS. 4B, 4C and 4D, the inner side flow passage C, the ring-shaped flow passage B and the outer side flow passage A are formed in such a manner that a cross-sectional area of a flow passage cross-section $S_c$ of the inner side flow passage C is smaller than each of a cross-sectional area of a flow passage cross-section $S_b$ of the ring-shaped flow passage B and a cross-sectional area of a flow passage cross-section $S_a$ of the outer side flow passage A. The flow passage cross-sections $S_a$, $S_b$, $S_c$ are cross-sectional surfaces which are orthogonal to a direction of flow of the respective flow passages A, B, C.

In a state where the rod guide case 19 is installed on the inner tube 12, an outer circumferential space on a lower side of the thread section 19E of the cylinder section 19A forms a gap with respect to the inner circumferential surface of the inner tube 12. This gap is a space which is continuous with the piston rod side oil chamber 21A in the hydraulic oil chamber 21.

As shown in FIG. 1, the bottom section 19B of the rod guide case 19 is a wall surface which is formed so as to close off a lower end section of the cylinder section 19A, and the oil reservoir chamber 22 and the hydraulic oil chamber 21 inside the inner tube 12 are defined by the cylinder section 19A and the bottom section 19B. The oil reservoir chamber 22 is a space which is formed by an inner circumference of the cylinder section 19A and the bottom section 19B, and a lower side region thereof functions as an oil chamber 22A in which hydraulic oil is stored, and an upper side region thereof functions as the air chamber 22B. Furthermore, the air chamber 22B is an air spring in the front fork 10.

A supply and discharge device is provided on the bottom section 19B so as to enable oil to be supplied and discharged between the hydraulic oil chamber 21 and the oil reservoir chamber 22. The supply and discharge device is provided with a check valve 60 which permits flow of oil from the oil reservoir chamber 22 to the piston rod side oil chamber 21A in a compression side stroke, and which prohibits flow of oil from the piston rod side oil chamber 21A to the oil reservoir chamber 22 in an extension side stroke.

More specifically, the check valve 60 is provided in a valve chamber 61 which is formed as a round hole which passes through the bottom section 19B of the rod guide case 19 in a thickness direction coaxially with the axis of the inner tube 12. The valve chamber 61 has a step section 61A which increases in diameter in a stepwise fashion from the upper end side on the circumferential surface. The check valve 60 and a back-up spring 62, a spring seat 51 and a stopper ring 51A are accommodated in this valve chamber 61. The check valve 60 is a cylindrical ring-shaped component having an outer circumference formed in a flange shape, and is able to seal off an opening of the valve chamber 61 due to a flange section thereof abutting with the step section 61A. The flange section of the check valve 60 is formed to be thinner than a gap between the step section 61A and the spring seat 51, for example. A cylindrical bush 63 which slidably supports the piston rod 23 is pressure-fitted into an inner circumference of the check valve 60, and the valve chamber 61 is provided so as to be able to move upwards and downwards inside the valve chamber 61 along an outer circumference of the piston rod 23 which passes through the bush 63.

A plate spring-shaped back-up spring 62, for example, is provided on a lower side of the check valve 60, and a spring seat 51 on which the back-up spring 62 is seated is provided on a lower side of this back-up spring 62. The back-up spring 62 abuts against a lower end surface of the flange section of the check valve 60, at a plurality of locations in a circumferential direction, on an inner circumference side of the back-up spring 62 or an outer circumference side thereof when seated on the spring seat 51. The spring seat 51 is formed in the shape of a petal valve of which an outer circumference undulates in a radial direction to form undulating portions, and is composed in such a manner that hydraulic oil can flow via the undulating portions in this outer circumference. The stopper ring 51A is fitted into a groove sunken in the radial direction, to a lower side of the step section 61A of the valve chamber 61, and thereby supports the spring seat 51 from the lower side.

In other words, the supply and discharge device is constituted by accommodating the check valve 60, the back-up spring 62 and the spring seat 51 in this order, in the valve chamber 61 which is formed in the bottom section 19B, and by installing the stopper ring 51A with the back-up spring 62 in a slightly compressed state. The spring seat 51 also functions as a spring seat of a rebound spring 53 which is interposed between the spring seat 51 and the spring seat 52 that has engaged with a stopper ring 52A provided on the piston rod 23, and when the front fork 10 is at maximum extension, the maximum extension stroke is restricted by pressurizing the rebound spring 53 between the spring seat 51 and the spring seat 52.

This supply and discharge device operates as follows.

In the compression side stroke, the check valve 60 moves downwards with movement of the piston rod 23 which enters into the inner tube 12, is displaced to a side of the spring seat 51, and forms a gap with respect to the step section 61A. Thereby, the hydraulic oil in the oil reservoir chamber 22 is able to flow into the piston rod side oil chamber 21A via the gap between the outer circumference of the check valve 60 and the step section 61A. Furthermore, in the extension side stroke, the check valve 60 moves upwards with the movement of the piston rod 23 which withdraws from the inner tube 12, is pressed by the step section 61A, and closes the gap between the outer circumference of the check valve 60 and an inner circumference of the valve chamber 61. Therefore, the hydraulic oil in the piston rod side oil chamber 21A is prohibited from flowing out to the oil reservoir chamber 22 along a reverse path to that of the compression side stroke.

As shown in FIG. 1, the inner tube 12 is provided with an oil hole 28 which connects the piston rod side oil chamber 21A of the hydraulic oil chamber 21 with the ring-shaped oil chamber 17, to the lower side of the bottom section 19B, when the rod guide case 19 has been installed. The oil hole 28 should be provided at a position where the connection between the piston rod side oil chamber 21A and the ring-shaped oil chamber 17 is not closed off by the piston 26 when the front fork is fully extended, for example.

Next, the outer tube 11 will be described.

As shown in FIG. 2, the outer tube 11 includes a guide bush 11A, an oil seal 11B and a dust seal 11C, on an inner circumference of a lower end side where the inner tube 12 is inserted. The guide bush 11A functions as a dividing member which, together with the seal member 20 which is provided on the inner tube 12 described above, define a space between the outer circumference of the inner tube 12 and the inner circumference of the outer tube 11, as a ring-shaped oil chamber 17. Furthermore, the guide bush 11A also functions as a supporting member which supports while enabling a mutual sliding action with the slide bush 12A which is installed on the inner tube 12. The ring-shaped oil chamber 17 is always connected to the piston rod side oil chamber 21A, via the oil hole 28 which passes from the inside to the outside of the inner tube 12 described above, and is filled with hydraulic oil. The oil seal 11B prohibits external outflow of hydraulic oil leaking from the guide bush 11A, due to a sliding motion of the inner tube 12 and the outer tube 11. Furthermore, the dust seal 11C prohibits external infiltration of foreign material, such as moisture or dust, etc.

The ring-shaped oil chamber 17 is constituted by a ring-shaped gap which is formed by the inner circumference of the outer tube 11 and the outer circumference of the inner tube 12, and if a cross-sectional area thereof is taken as S1, then the ring-shaped oil chamber is formed so as to be larger than a cross-sectional area of the piston rod 23 (the area of the region enclosed by the outer circumference) S2 (S1>S2). In other words, an inner diameter of the outer tube 11 and the outer diameter of the inner tube 12 which specify the cross-sectional area S1 of the ring-shaped oil chamber 17 are set so as to be larger than the cross-sectional area S2 of the piston rod 23.

As shown in FIG. 1, the cap 13 is screw fastened in a liquid-tight fashion onto an upper end opening section of the outer tube 11. The piston rod 23 for fixing the piston 26 is installed on this cap 13. The piston rod 23 is made from a hollow center cylinder of a prescribed length, one end side of which is screw coupled to an installation collar 24 provided by screw coupling to a central portion of a lower side of the cap 13, whereupon a lock nut 24A which screw couples with a thread section of the piston rod 23 is fastened towards the installation collar 24, thereby fixing the piston rod 23 to the cap 13. A front end of the piston rod 23 penetrates to the lower side of the bottom section 19B and reaches the hydraulic oil chamber 21, when the piston rod 23 has been fixed to the cap 13.

A piston bolt 25 is provided on the front end of the piston rod 23, and the piston 26 is fixed to this piston bolt 25. The piston 26 is provided, on an outer circumference thereof, with a piston ring 26A which slides along the inner circumferential surface of the inner tube 12, and this piston ring 26A divides the hydraulic oil chamber 21 into a piston rod side oil chamber 21A into which the piston rod 23 extends, and a piston side oil chamber 21B which is sealed by the piston ring 26A below the piston rod side oil chamber 21A.

The piston 26 is provided with a damping force generating apparatus which generates a damping force. The damping force generating apparatus includes a compression side flow passage 41 by which hydraulic oil present in the piston side oil chamber 21B flows into the piston rod side oil chamber 21A, during compression of the front fork 10, and an extension side flow passage 42 by which hydraulic oil present in the piston rod side oil chamber 21A flows into the piston side oil chamber 21B, during extension of the front fork 10. The compression side flow passage 41 and the extension side flow passage 42 are formed at respectively different positions as through holes passing through a thickness direction of the piston 26.

The compression side flow passage 41 is opened and closed by a compression side disk valve (compression side damping valve) 41A which is backed up by a valve stopper 41B. The extension side flow passage 42 is opened and closed by an extension side disk valve (extension side damping valve) 42A which is backed up by a valve stopper 42B. The valve stopper 41B, the compression side disk valve 41A, the piston 26, the extension side disk valve 42A and the valve stopper 42B are composed as a valve assembly 40 which is inserted into the piston bolt 25, and are fixed by being sandwiched by a piston nut 27 which is screw coupled onto the piston bolt 25.

The front fork 10 includes a damping force adjustment apparatus.

The damping force adjustment apparatus is constituted by a second adjustment mechanism 90 which adjusts the damping force by distorting deformation of the compression side disk valve 41A due to adjusting the set load of a valve pressing spring 97 which impels the compression side disk valve 41A in a closed direction, and a first adjustment mechanism 80 in which a needle valve 85 is introduced into a hollow center portion of the piston rod 23, and the flow amount of hydraulic oil between the piston rod side oil chamber 21A and the piston side oil chamber 21B is adjusted by adjusting the degree of opening of a bypass path 45 provided in the piston rod 23, through upward and downward movement of the needle valve 85. The bypass path 45 is a flow path connecting to the piston rod side oil chamber 21A and the piston side oil chamber 21B, by which hydraulic oil can flow inside the piston bolt 25, without passing via the compression side flow passage 41 and the extension side flow passage 42 of the piston 26.

An operating section which performs adjustment of the damping force by means of the first adjustment mechanism 80 and the second adjustment mechanism 90 is provided on the cap 13. Firstly, the operating section of the first adjustment mechanism 80 and the second adjustment mechanism 90 will be described. The cap 13 is composed as a cap assembly 200 which accommodates a first adjustment bolt 81 and a second adjustment bolt 91, which constitute the operating section, inside a space formed with the installation collar 24. The piston rod 23 for fixing the piston 26 is installed on a lower end of the installation collar 24.

The piston rod 23 is a hollow center cylinder body of a prescribed length, which is fixed to the cap 13 by fastening a lock nut 24A provided on a thread section that screw couples with the installation collar 24, towards the installation collar 24.

A cylindrical push rod 72 which is of smaller diameter than inner diameter than the piston rod 23 is inserted into the hollow center section of the piston rod 23, and furthermore, a push rod 71 which is of smaller diameter than inner diameter of the push rod 72 is inserted into the hollow center section of the push rod 72. The push rod 71 can adjust the damping force by moving in the axial direction, due to operation of the first adjustment bolt 81, and the push rod 72 can also adjust the damping force by moving in the axial direction, due to operation of the second adjustment bolt 91.

A stopper rubber 13A is installed on a ring-shaped recess section 201 which is formed by an inner circumference of the cap 13 and an outer circumference of the installation collar 24. To a lower side of the stopper rubber 13A, a circular ring-shaped stopper plate 13B is installed on the outer circumference of the installation collar 24, and a stopper ring 13C for engaging the stopper plate 13B with the installation collar 24 is also fitted.

The first adjustment bolt 81 of the first adjustment mechanism 80 and the second adjustment bolt 91 of the second adjustment mechanism 90 are respectively inserted in liquid-tight fashion from the rear surface side of the cap 13, via O-rings, or the like, (not illustrated), respectively into two installation holes which are formed in parallel alignment at positions distanced from a center of the cap 13.

The first adjustment bolt 81 and the second adjustment bolt 91 are accommodated, together with the adjustment nuts 82, 92, in a central recess section 202 which is formed by screw coupling the installation collar 24 onto the cap 13.

The adjustment nuts 82, 92 are accommodated inside the central recess section 202, slidably along an inner circumference of the installation collar 24, together with the first adjustment bolt 81 and the second adjustment bolt 91. The first adjustment nut 82 includes a thread hole 82A into which the thread section 81A of the corresponding first adjustment bolt 81 is screw coupled, and a guide hole 82B into which a guide section 91B of the second adjustment bolt 91 is inserted. The second adjustment nut 92 includes a thread hole 92A into which a thread section 91A of the corresponding second adjustment bolt 91 is screw coupled, and a guide hole 92B into which a guide section 81B fitted to the first adjustment bolt 81 is inserted. The push rod 71 which projects from the piston rod 23 and the hollow center section of the push rod 72 passes through a central hole 92C of the second adjustment nut 92 and abuts against a lower end surface of the first adjustment nut 82, and the push rod 72 which projects from the hollow center section of the piston rod 23 abuts against the lower end surface about the central hole 92C of the second adjustment nut 92.

In this cap assembly 200, the cap 13 is screw coupled in liquid-tight fashion onto the upper end opening section of the outer tube 11, via an O-ring 203.

The upper end operating section 80A of the first adjustment bolt 81 of the first adjustment mechanism 80 and the upper end operating section 90A of the second adjustment bolt 91 of the second adjustment mechanism 90 are arranged respectively in positions outside the center of the cap 13 in a plan view of the cap 13 which constitutes the cap assembly 200, at a level which coincides with the plane of the upper surface of the cap 13. The first adjustment bolt 81 of the first adjustment mechanism 80 is pivoted so as to be rotatable only inside the cap 13, without moving in the axial direction, and the second adjustment bolt 91 of the second adjustment mechanism 90 is pivoted so as to rotate only inside the cap 13, without moving in the axial direction.

Therefore, with a rotating operation of the first adjustment bolt 81, the first adjustment nut 82 which screw couples with the adjustment bolt 81 is guided in the axial direction and moves upwards or downwards, while being prevented from rotating by the engagement between the guide hole 82B of the first adjustment nut 82 and the guide section 91B of the second adjustment bolt 91.

Furthermore, with a rotating operation of the second adjustment bolt 91, the second adjustment nut 92 which screw couples with the second adjustment bolt 91 is guided in the axial direction and moves upwards or downwards, while being prevented from rotating by the engagement between the guide hole 92B of the second adjustment nut 92 and the guide section 81B of the first adjustment bolt 81.

The second adjustment mechanism 90 in which the damping force is adjusted by the second adjustment bolt 91 described above is constituted in general terms by the push rod 72, a valve pressing spring 97 and a valve pressing member 96.

A pressing piece 94 which abuts against a lower end of the push rod 72 is installed slidably in the axial direction, projections on either side of the pressing piece 94 being engaged with guide holes 23A provided on a lower end side of the piston rod 23, on either side of the diameter direction.

The lower end surface of the push rod 72 which is inserted into the hollow center section of the piston rod 23 makes direct contact with an upper surface of the pressing piece 94, and a shaft section of the needle valve 85 inserted into the piston bolt 25 is inserted into a lower end section of the push rod 72. There is a prescribed amount of play between the push rod 72 and the shaft section.

A spring holder 95 which abuts from below against both end projections of the pressing piece 94, and a valve pressing member 96 which abuts against an upper surface (rear surface) of the compression side disk valve 41A are arranged about a lower end section of the piston rod 23 (the piston bolt 25). The valve pressing spring 97 is interposed between the spring holder 95 and the valve pressing member 96.

The spring holder 95 has a cup shape and abuts with both side projections of the pressing piece 94 at a lower end of an inner circumference of the cup, and an upper end of the valve pressing spring 97 is seated on an upper end outer circumference flange of the cup. The valve pressing member 96 is provided with a circular ring-shaped pressing section 96A which abuts continuously or intermittently about the whole circular circumference of a prescribed position on the upper surface of the compression side disk valve 41A, a slide section 96B which is guided to slide on the outer circumference of the upper end of the piston bolt 25, and an oil path 96C which connects the piston rod side oil chamber 21A to the compression side flow passage 41, the extension side flow passage 42 and the bypass path 45; the valve pressing spring 97 is seated on an outer circumferential step section.

By rotating the adjustment bolt 91 of the second adjustment mechanism 90, the push rod 72 is moved in the axial direction and the pressing piece 94 which abuts against the lower end surface of the push rod 72 moves the spring holder 95 upwards and downwards, whereby the set load of the valve pressing spring 97 is adjusted by extension and compression of the valve pressing spring 97. Consequently, the set load of the valve pressing spring 97 is such that the compression side disk valve 41A is pressed against an upper end surface of the piston 26 via the valve pressing member 96, thereby adjusting the compression side damping force produced by the distorting deformation of the compression side disk valve 41A.

The first adjustment mechanism 80 by which the damping force is adjusted by the first adjustment bolt 81 is constituted in general terms by the needle valve 85 and the push rod 71. An outer circumference of the needle valve 85 is supported by an inner base 84 which is fitted in a hollow center section of a lower end of the piston rod 23. The inner base 84 is a cylindrical member having a flange section on an outer circumference thereof, a cylindrical section thereof is installed in the hollow center section of the lower end of the piston rod 23, and the flange section is sandwiched and fixed by an inner diameter step section of the piston bolt 25 and the lower end of the piston rod 23. The inner base 84 may be press-fitted into the hollow center section of the piston rod 23.

The outer circumference of the needle valve 85 is inserted in a liquid-tight fashion on an inner circumference of the inner base 84. The needle valve 85 is provided with a flange section 85A which slides on the outer circumference of the piston rod 23, and a needle valve 85 is provided by interposing a spring 86 between a lower end surface of the flange section 85A and an upper end surface of the inner base 84. The spring 86 impels the needle valve 85 upwards in the axial direction (the valve opening direction), and the push rod 71 is pushed upwards by an upper end surface of the needle valve 85 and is pressed against the first adjustment nut 82.

Consequently, when the first adjustment nut 82 is moved upwards and downwards due to the rotation of the first adjustment bolt 81, the needle valve 85 abutting in the axial direction against the push rod 71 moves upwards and downwards with respect to the piston bolt 25. Therefore, the degree of opening of the bypass path 45 is adjusted by withdrawing the needle valve 85 with respect to a valve seat (not illustrated) in an upper end portion of a vertical hole of the bypass path 45 which is provided in the piston bolt 25, and the compression side and the extension side damping forces caused by the flow passage resistance of the bypass path 45 can be adjusted.

Below, the operation of the front fork 10 will be described.

[Compression Side Stroke]

Figure 5:
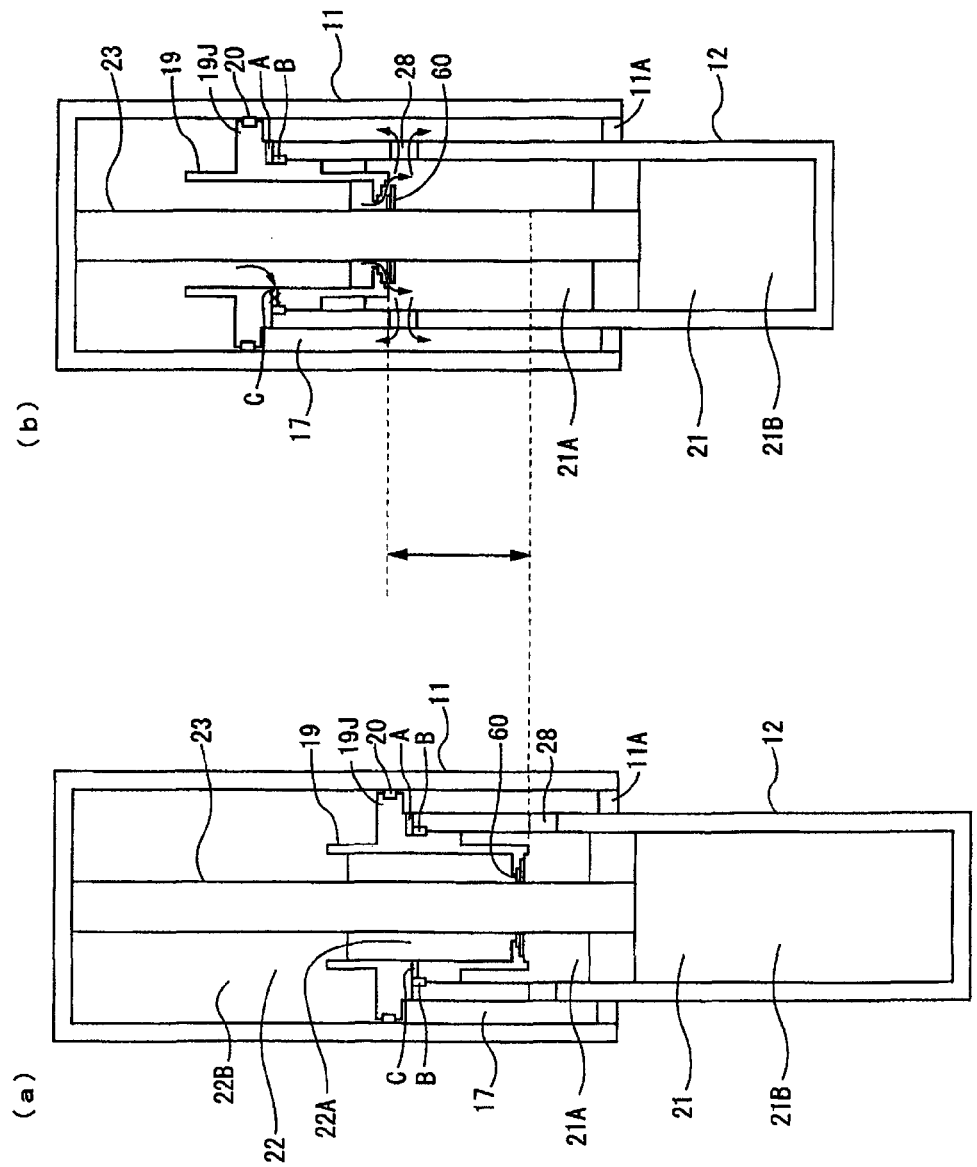
FIGS. 5($a$) and 5($b$) show conceptual diagrams showing an operation of a compression side stroke. In particular, FIG. 5($a$) indicates the operation in a pre-compression state and FIG. 5($b$) indicates the operation in a compressed state.

As shown in FIG. 5(a) and FIG. 5(b), in the compression side stroke, the distance between the protruding section 19J of the projecting upper end section 19C and the guide bush 11A is increased, and the volume of the ring-shaped oil chamber 17 is raised, by entry of the inner tube 12 into the outer tube 11. This rise in volume causes hydraulic oil corresponding to the entered volume of the piston rod 23 that has entered into the hydraulic oil chamber 21 of the inner tube 12 to flow into the ring-shaped oil chamber 17 via the oil hole 28 of the inner tube 12.

More specifically, since the volume increase $\Delta S1$ (replenishment volume) of the ring-shaped oil chamber 17 due to the extending action of the front fork is greater than the volume increase $\Delta S2$ of the piston rod 23, then the shortfall ($\Delta S1 - \Delta S2$) in the required replenishment volume to the ring-shaped oil chamber 17 is replenished from the oil reservoir chamber 22 via the check valve 60. In the compression side stroke, the ring-shaped oil chamber 17 assumes a negative pressure state with respect to the air chamber 22B, but since the flow passage cross-section Sc of the inner side flow passage C is small, then air in the air chamber 22B flows into the inner side flow passage C while being compressed.

In a high-frequency operation of the front fork 10 at or above the resonance point of the vehicle body, the fork transfers to the next extension side stroke before reaching the ring-shaped oil chamber 17, and therefore the air in the air chamber 22B which has entered into the inner side flow passage C is drawn back again into the air chamber 22B via the ring-shaped flow passage B which is a long flow passage, in comparison with the air escape path shown in Patent Literature 2, for example. Consequently, reverse flow of air from the air chamber 22B into the ring-shaped oil chamber 17 is prevented without requiring a check valve to open and close the air escape path, as present in Patent Literature 2. Here, the resonance point of the vehicle body is when the frequency of vibration that is input to the wheel from the road surface during travel matches the frequency of the vibration that is transmitted to the vehicle body when the vibration input to the wheel is input to the vehicle body via the front fork 10.

In this compression side stroke, in a low-speed range, the compression side damping force is generated by the flow passage resistance of the bypass path 45, of which the degree of opening is adjusted by the needle valve 85, and in a medium and high-speed range, the compression side damping force is generated by distorting deformation of the compression side disk valve 41A.

[Extension Side Stroke]

Figure 6:
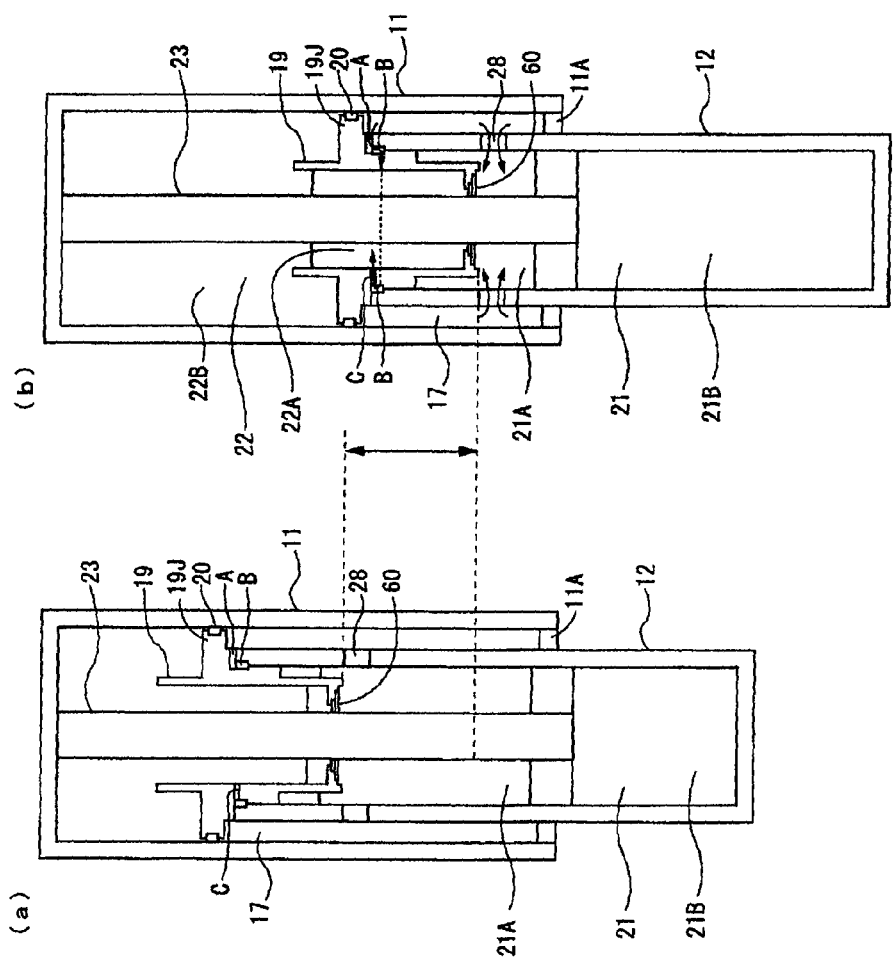
FIGS. 6($a$) and 6($b$) show conceptual diagrams showing an operation of an extension side stroke. In particular, FIG. 6($a$) indicates the operation in a pre-extension state and FIG. 6($b$) indicates the operation in an extended state.

In the extension side stroke, as shown in FIG. 6(a) and FIG. 6(b), since the inner tube 12 is withdrawn from the outer tube 11, then the distance between the protruding section 19J of the projecting upper end section 19C and the guide bush 11A is reduced and the volume of the ring-shaped oil chamber 17 is compressed. Due to this compression, the hydraulic oil in the ring-shaped oil chamber 17 pushes the air bubbles that have collected in the upper portion of the interior of the ring-shaped oil chamber 17, out into the oil reservoir chamber 22 via the outer side flow passage A, the ring-shaped flow passage B and the inner side flow passage C, in addition to which hydraulic oil of an amount corresponding to the withdrawn volume of the piston rod 23 which is withdrawn from the hydraulic oil chamber 21 flows from the ring-shaped oil chamber 17 and into the piston rod side oil chamber 21A on the inner circumference of the inner tube 12, via the oil hole 28 of the inner tube 12. More specifically, since the volume decrease ΔS1 (expelled volume) of the ring-shaped oil chamber 17 due to the extending operation of the front fork is greater than the volume decrease ΔS2 of the piston rod 23, then the surplus (ΔS1-ΔS2) of the expelled volume of hydraulic oil from the ring-shaped oil chamber 17 is expelled to the oil reservoir chamber 22 via the outer side flow passage A, the ring-shaped flow passage B and the inner side flow passage C.

In this extension side stroke, in the low-speed range, the extension side damping force is generated by the flow passage resistance of the bypass path 45 of which the degree of opening is adjusted by the needle valve 85, and in the medium and high-speed range, the extension side damping force is generated by distorting deformation of the extension side disk valve 42A. Furthermore, an extension side damping force is also obtained due to the flow passage resistances of the outer side flow passage A, the ring-shaped flow passage B and the inner side flow passage C described above.

An embodiment of the present invention was described in detail above with reference to the drawings, but the specific composition of the present invention is not limited to this embodiment and the present invention may also include design modifications, and the like, within a range that does not deviate from the essence of the invention. For example, the configurations indicated below may be adopted.

Second Embodiment

Figure 7:
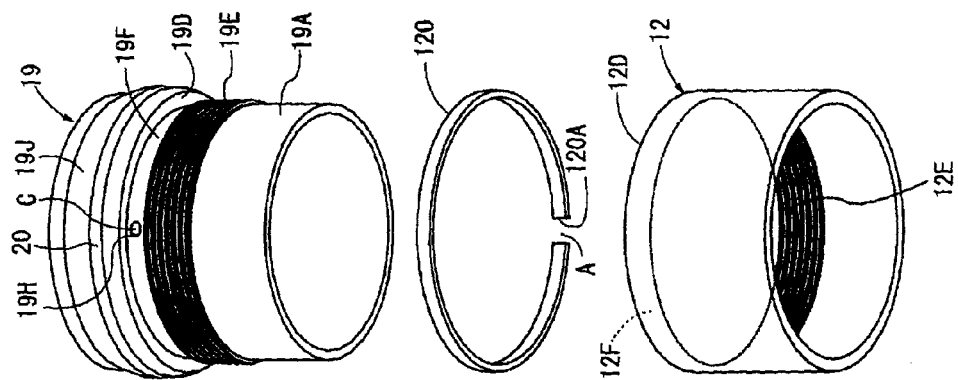
FIG. 7 is a diagram showing a further mode of an outer side flow passage.

As a further mode of the outer side flow passage A, as shown in FIG. 7, it is possible to arrange a ring member 120 between the abutting surface 19D of the rod guide case 19 and the open side end surface 12D of the inner tube 12, and to take a cutaway section 120A provided about the periphery of the ring member 120 as the outer side flow passage A. In this case, the flow passage cross-section Sa can be adjusted with respect to the flow passage cross-section Sb of the ring-shaped flow passage B and the flow passage cross-section Sc of the inner side flow passage C, by changing the thickness of the washer or the dimensions of the cutaway section.

Third Embodiment

Figure 8:
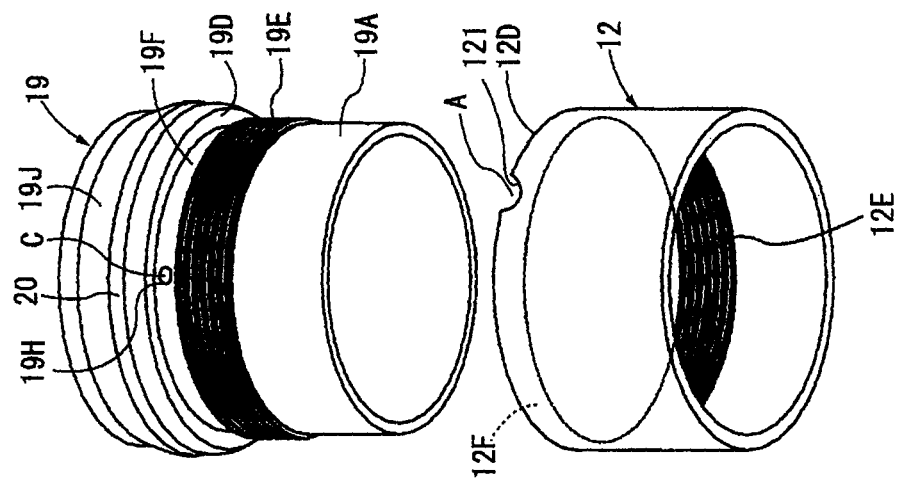
FIG. 8 is a diagram showing a further mode of an outer side flow passage.

Furthermore, as a further mode of the outer side flow passage A, as shown in FIG. 8, it is possible to form a cutaway section 121 which is cut away in a thickness direction on the front end side of the inner tube 12.

Fourth Embodiment

Furthermore, as a further mode of the inner side flow passage C, it is possible to provide a plurality of inner side flow passages C. In this case, the total area of the cross-sectional areas of the flow passage cross-sections Sc of the plurality of inner side flow passages C should be set so as to be smaller than each of the cross-sectional area of the flow passage cross-section Sb of the ring-shaped flow passage B and cross-sectional area of the flow passage cross-section Sa of the outer side flow passage A. By adopting a composition of this kind, it is possible to prevent reverse flow of air in the air chamber 22B of the oil reservoir chamber 22, into the ring-shaped oil chamber 17 or the gaps in the inner tube 12 and the rod guide case 19.

Furthermore, in the first embodiment, the ring-shaped flow passage B is provided between the incomplete thread section 19F which is continuous with the thread section 19E of the rod guide case 19 and the incomplete thread section 12F which is continuous with the thread section 12E of the inner tube 12, but the invention is not limited to this and the position of the ring-shaped flow passage B can be set appropriately without using the incomplete thread sections 12F, 19F, provided that it is within a range from the abutting surface 19D to the screw coupling start portion of the thread section 19E.

Moreover, it is also possible to connect the oil reservoir chamber 22 and the hydraulic oil chamber 21 by providing a fine flow passage as a through hole which connects to the side of the bottom section 19B of the rod guide case 19 in the thickness direction, the hole having a prescribed opening diameter. In this case, the fine flow passage should be provided in at least one position in the circumferential direction, in such a manner that hydraulic oil in the piston rod side oil chamber 21A flows into the oil reservoir chamber 22 during the extension side stroke.

The front fork 10 described in the first to fourth embodiments is described as being provided with first and second adjustment mechanisms 80, 90 as the damping force adjustment apparatus, but it is also possible to obtain the beneficial effects described above in a front fork which is not provided with the first and second adjustment mechanisms 80, 90.

What is claimed is:

1. A hydraulic shock absorber for a vehicle, comprising:
an outer tube;
an inner tube which is inserted movably inside the outer tube;
a ring-shaped oil chamber which is formed by a plurality of dividing members which divide a space formed by an inner circumference of the outer tube and an outer circumference of the inner tube, in an axial direction;
a partition wall member which is installed in an open side end section of the inner tube and which divides an internal space of the inner tube into an oil reservoir chamber and a hydraulic oil chamber along the axial direction;
an abutting surface which projects in a radial direction from an outer circumference of the partition wall member and which abuts against an open side end surface of the inner tube in a state that the partition wall member is installed on the inner tube;
a piston rod which is installed on the outer tube and which passes through the partition wall member and reaches into the hydraulic oil chamber, a cross-sectional area of the ring-shaped oil chamber being set to be larger than a cross-sectional area of the piston rod;
a piston which is provided on a hydraulic oil chamber side of the piston rod and which slides in contact with an inner circumference of the inner tube, the piston dividing the hydraulic oil chamber into a piston rod side oil chamber and a piston side oil chamber; and an oil hole which is provided in the inner tube and connects between the ring-shaped oil chamber and the piston rod side oil chamber, wherein the partition wall member is installed on the inner tube by screw coupling of a thread section formed in a prescribed range in the axial direction on the outer circumference of the partition wall member, and a thread section formed in a prescribed range in the axial direction on the inner circumference of the inner tube, and the hydraulic shock absorber further comprises: a ring-shaped flow passage formed continuously along a circumferential direction between the outer circumference of the partition wall member and the inner circumference of the inner tube, in a range from the abutting surface to a screw coupling starting portion of the thread section of the inner tube; an outer side flow passage which is formed to a ring-shaped oil chamber side from one of the plurality of the dividing members positioned on an open end surface side of the inner tube and which connects the ring-shaped oil chamber and the ring-shaped flow passage, at least one inner side flow passage which is formed in the partition wall member and which connects the ring-shaped flow passage and the oil reservoir chamber.

2. The hydraulic shock absorber according to claim 1, wherein the ring-shaped flow passage is formed in a range between the thread section formed on the partition wall member and an incomplete thread section on a screw coupling starting side in the thread section formed on the inner tube.

3. The hydraulic shock absorber according to claim 1, wherein the outer side flow passage is formed as a groove reaching the ring-shaped oil chamber from the ring-shaped flow passage, by cutting away a portion of the abutting surface of the partition wall member.

4. The hydraulic shock absorber according to claim 1, further comprising a ring member arranged between the abutting surface of the partition wall member and the open end surface of the inner tube, wherein the outer side flow passage is formed by a cutaway section provided in the ring member.

5. The hydraulic shock absorber according to claim 1, wherein a cross-sectional area of a flow passage cross-section of the inner side flow passage is set to be smaller than each of a cross-sectional area of a flow passage cross-section of a ring-shaped flow passage and a cross-sectional area of a flow passage cross-section of the outer side flow passage.

6. The hydraulic shock absorber according to claim 1, wherein the at least one inner side flow passage includes a plurality of the inner side flow passages provided in the partition wall member, and a total cross-sectional area of the flow passage cross-sections of the plurality of inner side flow passages is set to be smaller than each of a cross-sectional area of a flow passage cross-section of the ring-shaped flow passage and a cross-sectional area of a flow passage cross-section of the outer side flow passage.

* * * * *